(12) United States Patent
Iwamoto et al.

(10) Patent No.: US 9,518,148 B2
(45) Date of Patent: Dec. 13, 2016

(54) OXYGEN-ABSORBING RESIN COMPOSITION

(71) Applicant: MITSUBISHI GAS CHEMICAL COMPANY, INC., Tokyo (JP)

(72) Inventors: Shinpei Iwamoto, Kanagawa (JP); Satoshi Okada, Kanagawa (JP); Shinichi Ikeda, Tokyo (JP); Kenichiro Usuda, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 55 days.

(21) Appl. No.: 14/433,482

(22) PCT Filed: Oct. 9, 2013

(86) PCT No.: PCT/JP2013/077527
§ 371 (c)(1),
(2) Date: Apr. 3, 2015

(87) PCT Pub. No.: WO2014/057991
PCT Pub. Date: Apr. 17, 2014

(65) Prior Publication Data
US 2015/0259467 A1  Sep. 17, 2015

(30) Foreign Application Priority Data

Oct. 10, 2012 (JP) .................................. 2012-224915

(51) Int. Cl.
*C08G 63/181* (2006.01)
*B65D 81/26* (2006.01)
(Continued)

(52) U.S. Cl.
CPC ............. *C08G 63/00* (2013.01); *B65D 81/266* (2013.01); *C08G 63/181* (2013.01); *C08G 63/54* (2013.01)

(58) Field of Classification Search
CPC ..... B65D 81/266; C08G 63/00; C08G 63/181; C08G 63/54
See application file for complete search history.

(56) References Cited

U.S. PATENT DOCUMENTS 3,505,282 A   4/1970 Storms et al.
5,356,740 A  10/1994 Steinmann
(Continued)

FOREIGN PATENT DOCUMENTS

CN  102414246  4/2012
JP  5-115776  5/1993
(Continued)

OTHER PUBLICATIONS

International Search Report from PCT/JP2013/077527, mail date is Jan. 14, 2014.
(Continued)

*Primary Examiner* — Ling Choi
*Assistant Examiner* — Gennadiy Mesh
(74) *Attorney, Agent, or Firm* — Greenblum & Bernstein, P.L.C.

(57) ABSTRACT

An oxygen-absorbing resin composition comprising a polyester compound having a constitutional unit (a), which has at least one tetralin ring selected from the group consisting of the following general formulas (1) to (4) and a constitutional unit (b) comprising residue of tetrahydrophthalic anhydride derivative which is represented by the following general formula (5) and/or general formula (6).

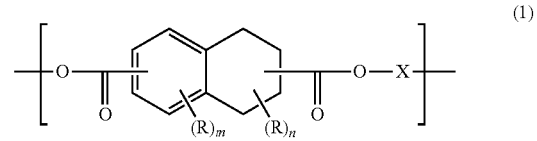

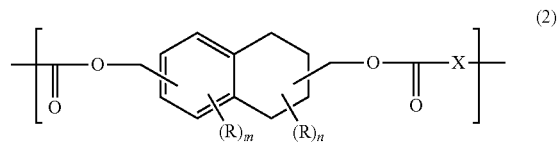

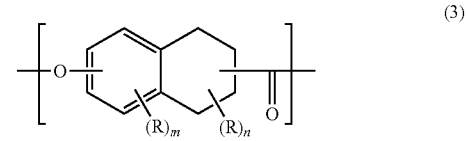

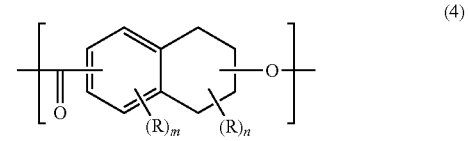

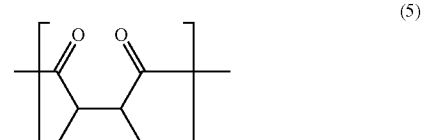

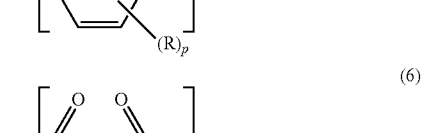

4 Claims, No Drawings

(51) Int. Cl.
  *C08G 63/00* (2006.01)
  *C08G 63/54* (2006.01)

(56) References Cited

U.S. PATENT DOCUMENTS

| | | |
|---|---|---|
| 5,529,833 A | 6/1996 | Speer et al. |
| 6,063,503 A | 5/2000 | Hatakeyama et al. |
| 6,124,043 A | 9/2000 | Tsukamoto et al. |
| 2012/0001121 A1 | 1/2012 | Ishizaki et al. |
| 2014/0308405 A1 | 10/2014 | Okada et al. |

FOREIGN PATENT DOCUMENTS

| | | |
|---|---|---|
| JP | 5-339474 | 12/1993 |
| JP | 7-112949 | 5/1995 |
| JP | 8-134194 | 5/1996 |
| JP | 9-234832 | 9/1997 |
| JP | 10-331032 | 12/1998 |
| JP | 11-255913 | 9/1999 |
| JP | 2001-252560 | 9/2001 |
| JP | 2003-521552 | 7/2003 |
| JP | 2013-129817 | 7/2013 |
| WO | 99/48963 | 9/1999 |

OTHER PUBLICATIONS

International Preliminary Examination Report in PCT/JP2013/077527 issued Apr. 14, 2015.

OXYGEN-ABSORBING RESIN COMPOSITION

TECHNICAL FIELD

The present invention relates to an oxygen-absorbing resin composition.

BACKGROUND ART

In order to prevent oxygen oxidation and store various types of articles, represented by foods, beverages, medicinal products, cosmetics, which easily deteriorate or degrade under the effect of oxygen for a long time, oxygen absorbents are used for removing oxygen within packaging bodies storing these articles.

As the oxygen absorbent, an oxygen absorbent containing an iron powder as a reactive main component is generally used in view of oxygen-absorbing ability, handling and safety. However, the iron-based oxygen absorbent is responsive to a metal detector and thus it is difficult to use a metal detector in inspecting foreign matter. Furthermore, packaging bodies containing an iron-based oxygen absorbent have a risk of ignition, and thus, they cannot be heated by a microwave oven. Moreover, the oxidation reaction of an iron powder requires water, and thus, an oxygen-absorbing effect is exerted only on an objects to be stored rich in moisture content.

Packaging containers are developed by making the container of a multilayered material having an oxygen-absorbing layer formed of an oxygen-absorbing resin composition containing a thermoplastic resin and an iron-based oxygen absorbent, thereby improving a gas barrier property of the container and providing an oxygen-absorbing function to the container itself (see, Patent Literature 1). However, such an oxygen-absorbing multilayer film has the same problems: a metal detector cannot be used; heating cannot be made by a microwave oven; and the effect is only exerted on an objects to be stored rich in moisture content. In addition, the multilayer film has a problem of opacity, leading to insufficient visibility of content.

In the aforementioned circumstances, it has been desired to develop an oxygen absorbent containing an organic substance as a reactive main component. As the oxygen absorbent containing an organic substance as a reactive main component, an oxygen absorbent containing ascorbic acid as a main component is known (see, Patent Literature 2).

In the meantime, an oxygen-absorbing resin composition composed of a resin and a transition metal catalyst and having an oxygen trapping property is known. For example, a resin composition composed of a polyamide as an oxidizable organic component, in particular, a xylylene group-containing polyamide, and a transition metal catalyst, is known. Furthermore, a resin composition having an oxygen trapping function and a product obtained by molding the resin composition, such as an oxygen absorbent, a packaging material and a multilayer laminate film for packaging, are further exemplified (see Patent Literature 3).

As an oxygen-absorbing resin composition requiring no moisture content for absorbing oxygen, an oxygen-absorbing resin composition composed of a resin having a carbon-carbon unsaturated bond and a transition metal catalyst, is known (see, Patent Literature 4).

As a composition for trapping oxygen, a composition composed of a polymer containing a substituted cyclohexene functional group or a low molecular-weight substance bound with the cyclohexene ring and a transition metal is known (see, Patent Literature 5).

CITATION LIST

Patent Literatures

Patent Literature 1: Japanese Patent Laid-Open No. H09-234832
Patent Literature 2: Japanese Patent Laid-Open No. S51-136845
Patent Literature 3: Japanese Patent Laid-Open No. 2001-252560
Patent Literature 4: Japanese Patent Laid-Open No. H05-115776
Patent Literature 5: National Publication of International Patent Application No. 2003-521552

SUMMARY OF INVENTION

Technical Problem

However, the oxygen-absorbing resin composition of Patent Literature 2 has problems in that the oxygen-absorbing performance is primarily low; an effect is exerted only on an object to be stored rich in moisture content; and the cost is relatively high.

The resin composition of Patent Literature 3 has the following problem. Since an oxygen-absorbing function is exerted by oxidizing a xylylene group-containing polyamide resin in the presence of a transition metal catalyst, the strength of a resin decreases by oxidation degradation, with the result that the strength of the packaging container itself decreases. In addition, the oxygen-absorbing performance of the resin composition described therein is still insufficient and the effect is exerted only on an object to be stored rich in moisture content.

The oxygen-absorbing resin composition of Patent Literature 4 has a problem in that a polymer chain of a resin is cut by oxidation to produce low molecular weight organic compounds serving as odor components and odor intensity increases after absorption of oxygen.

The composition of Patent Literature 5 has problems in that a special material containing a cyclohexene functional group must be used, and that this material relatively easily generates odor and is relatively expensive.

The present invention was made in consideration of the problems mentioned above and is directed to providing an oxygen-absorbing resin composition having excellent oxygen-absorbing performance in a wide range of humidity conditions from low humidity to high humidity and providing a molded article which can maintain its shape even after absorption of oxygen.

Solution to Problem

The present inventors conducted studies on an oxygen-absorbing resin composition. As a result, they found that the aforementioned problems can be solved by using a polyester compound having a specific structure, and accomplished the present invention.

More specifically, the present invention is as follows:

[1]

An oxygen-absorbing resin composition comprising a polyester compound having a constitutional unit (a), which has at least one tetralin ring, selected from the group consisting of the following general formulas (1) to (4) and a constitutional unit (b), which is represented by the following general formula (5) and/or general formula (6):

[Formula 1]

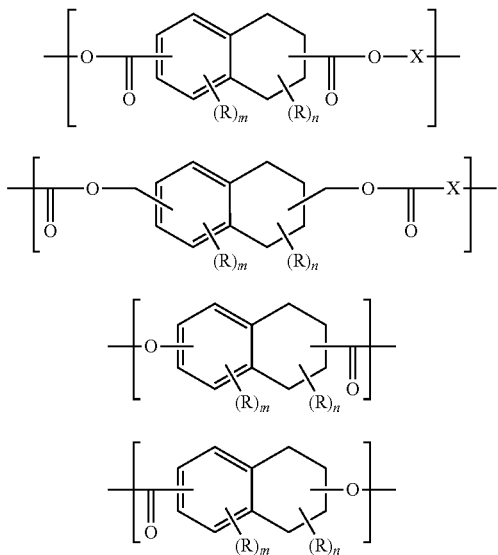

wherein R each independently represent a monovalent substituent, the monovalent substituent being at least one selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a thiol group, an alkylthio group, an arylthio group, a heterocyclic thio group and an imido group, optionally further having a substituent; wherein at least one hydrogen atom is bound to a benzyl position of the tetralin ring; wherein X represents a divalent group comprising at least one group selected from the group consisting of an aromatic hydrocarbon group, a saturated or unsaturated alicyclic hydrocarbon group and a linear or branched and saturated or unsaturated aliphatic hydrocarbon group and a heterocyclic group; wherein m each independently represent an integer of 0 to 3 and n each independently represent an integer of 0 to 6.

[Formula 2]

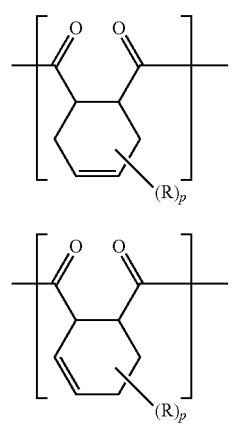

wherein R each independently represent a monovalent substituent, the monovalent substituent being at least one selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a thiol group, an alkylthio group, an arylthio group, a heterocyclic thio group and an imido group, optionally further having a substituent; wherein p each independently represent an integer of 1 to 5.

[2]
The oxygen-absorbing resin composition according to [1], wherein the polyester compound contains the constitutional unit (a) represented by the general formula (1) and the constitutional unit (b) in a molar ratio of 99:1 to 50:50.

[3]
The oxygen-absorbing resin composition according to [1] or [2], wherein the constitutional unit (a) is at least one selected from the group consisting of the following formula (7), formula (8) and formula (9).

[Formula 3]

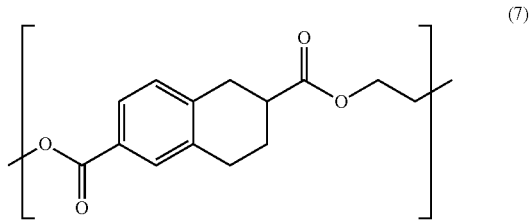

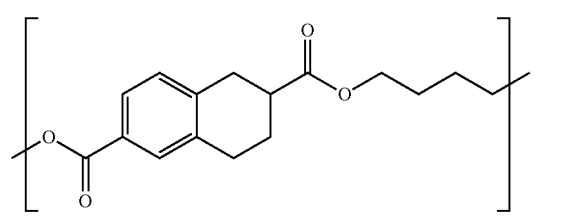

[4]
The oxygen-absorbing resin composition according to any one of [1] to [3], wherein the constitutional unit (b) is at least the following formula (10) and/or formula (11), a total amount of formula (10) and formula (11) in the constitutional unit (b) is 50 mol % or more.

[Formula 4]

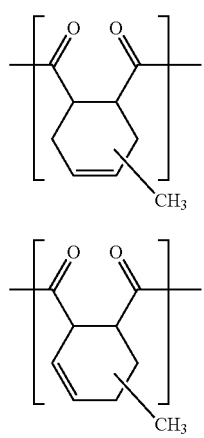

Advantageous Effects of Invention

According to the present invention, it is possible to realize an oxygen-absorbing resin composition having excellent oxygen-absorbing performance in a wide range of humidity conditions from low humidity to high humidity and providing a molded article which can maintain its shape even after absorption of oxygen. In addition, the oxygen-absorbing resin composition, since it can absorb oxygen regardless of the presence or absence of the moisture content of an object to be stored and is expected to suppress odor generation after absorption of oxygen, can be applied to a wide variety of uses, regardless of the types of products, including foods, prepared foods, beverages, medicinal products and health foods. Furthermore, it is also possible to provide an oxygen-absorbing resin composition not responsive to a metal detector. Moreover, since a polyester compound can maintain its structure without cleavage of the molecular chain thereof by oxidation even after absorption of oxygen, appearance of the polyester compound can be satisfactorily maintained and suppression of strength reduction can be also expected.

DESCRIPTION OF EMBODIMENTS

Now, embodiments of the present invention will be described in detail below (hereinafter simply referred to as "the present embodiment(s)"). Note that the following embodiments are examples for explaining the present invention and the following contents of the present embodiments are not construed as limiting the present invention. The present invention can be appropriately modified within the gist of the invention and carried out.

The oxygen-absorbing resin composition of the present embodiment is an oxygen-absorbing resin composition comprising a polyester compound having a constitutional unit (a), which has at least one tetralin ring selected from the group consisting of the following general formulas (1) to (4) and a constitutional unit (b), which is represented by the following general formula (5) and/or general formula (6). The oxygen-absorbing resin composition of the present embodiment can exhibit excellent oxygen absorptivity not only in high-humidity conditions but also in low-humidity conditions as well as can suppress odor. Furthermore, since it is not necessary for the oxygen-absorbing resin composition of the present embodiment to use iron for absorbing oxygen, a non-iron oxygen-absorbing resin composition (substantially comprising no iron) can be realized.

[Formula 5]

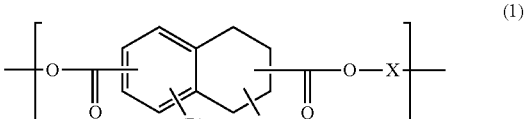

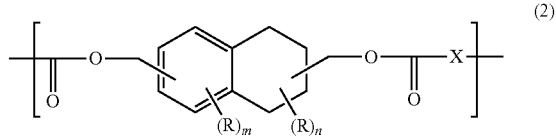

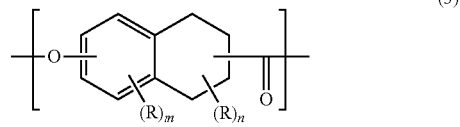

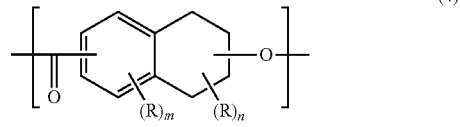

wherein R each independently represents a monovalent substituent, the monovalent substituent being at least one selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a thiol group, an alkylthio group, an arylthio group, a heterocyclic thio group and an imido group, optionally further having a substituent; wherein at least one hydrogen atom is bound to a benzyl position of a tetralin ring; wherein X represents a divalent group comprising at least one group selected from the group consisting of an aromatic hydrocarbon group, a saturated or unsaturated alicyclic hydrocarbon group and a linear or branched and saturated or unsaturated aliphatic hydrocarbon group and a heterocyclic group; wherein m each independently represents an integer of 0 to 3 and n each independently represents an integer of 0 to 6.

[Formula 6]

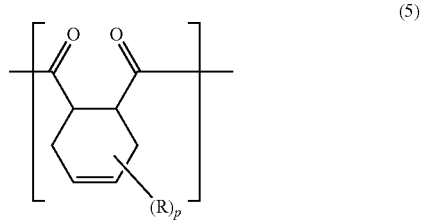

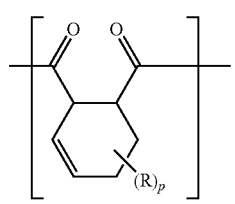

(6)

wherein R each independently represents a monovalent substituent, the monovalent substituent being at least one selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a thiol group, an alkylthio group, an arylthio group, a heterocyclic thio group and an imido group, optionally further having a substituent; wherein p each independently represents an integer of 1 to 5.

It is preferable that the constitutional unit (a) is at least one selected from the group consisting of the following formula (7), formula (8) and formula (9). Owing to use of these, it is possible to easily obtain raw materials and reduce cost. As the constitutional unit (a), these structures may be used alone or in combination with two or more.

[Formula 7]

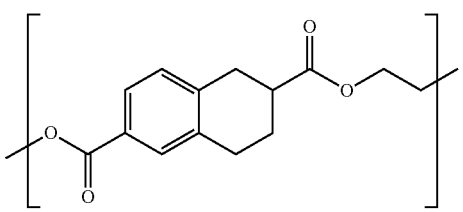

(7)

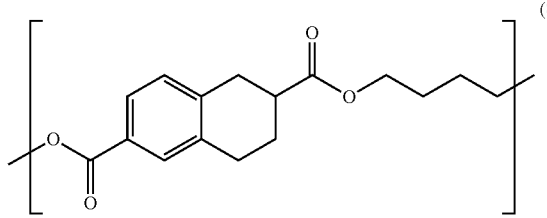

(8)

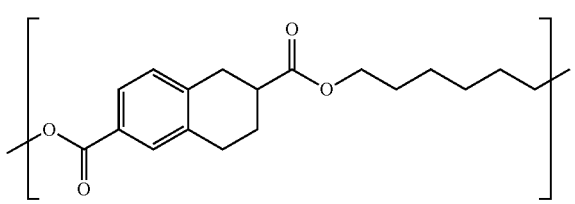

(9)

It is preferable that the constitutional unit (b) is the following formula (10) or formula (11). Owing to use of these, it is possible to easily obtain a raw material and reduce cost. As the constitutional unit (b), either one or both of these structures may be employed. Furthermore, as the constitutional unit (b), a constitutional unit other than those represented by the formula (10) and the formula (11) may be used in combination.

[Formula 8]

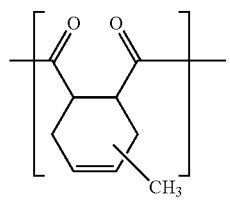

(10)

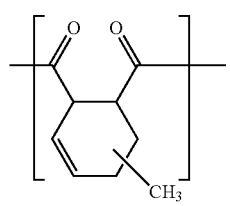

(11)

Furthermore, the constitutional unit (b) is at least the formula (10) and/or the formula (11) and the total amount of the formula (10) and the formula (11) in the constitutional unit (b) is preferably 50 mol % or more, more preferably 55 mol % or more, further preferably 60 mol % or more, further more preferably 90 mol % or more, and still more preferably 100 mol %. Herein, "the total amount of the formula (10) and the formula (11)" is not limited to the case where both of the formula (10) and the formula (11) are present, and includes, for example, the case where either the formula (10) or the formula (11) is present, unless otherwise specified.

In the general formulas (1) to (6) and (12) to (23), examples of the monovalent substituent represented by R include, but not particularly limited to, for example, a halogen atom (for example, a chlorine atom, a bromine atom, an iodine atom, etc.), an alkyl group (a linear, branched or cyclic alkyl group having preferably 1 to 15 carbon atoms and more preferably 1 to 6 carbon atoms, such as a methyl group, an ethyl group, a n-propyl group, an isopropyl group, a tert-butyl group, a n-octyl group, a 2-ethylhexyl group, a cyclopropyl group, and a cyclopentyl group, etc.), an alkenyl group (a linear, branched or cyclic alkenyl group having preferably 2 to 10 carbon atoms and more preferably 2 to 6 carbon atoms, such as a vinyl group and an allyl group, etc.), an alkynyl group (an alkynyl group having preferably 2 to 10 carbon atoms and more preferably 2 to 6 carbon atoms, such as an ethynyl group and a propargyl group, etc/), an aryl group (an aryl group having preferably 6 to 16 carbon atoms and more preferably 6 to 10 carbon atoms, such as a phenyl group and a naphthyl group, etc.), a heterocyclic group (a monovalent group obtained by removing a single hydrogen atom from a 5-member or 6-member aromatic or non-aromatic heterocyclic compound having preferably 1 to 12 carbon atoms and more preferable 2 to 6 carbon atoms, such as a 1-pyrazolyl group, a 1-imidazolyl group and a 2-furyl group), a cyano group, a hydroxy group, a carboxyl group, an ester group, an amido group, a nitro group, an alkoxy group (linear, branched or cyclic alkoxy group having preferably 1 to 10 carbon atoms and more preferably 1 to 6 carbon atoms, such as a methoxy group and an ethoxy group, etc.), an aryloxy group (an aryloxy group having preferably 6 to 12 carbon atoms and more preferably 6 to 8 carbon atoms, such as a phenoxy group, etc.), an acyl group (including a formyl group. An alkyl carbonyl group having preferably 2 to 10 carbon atoms and more preferably 2 to 6 carbon atoms, and an arylcarbonyl group having preferably 7 to 12 carbon atoms and more preferably 7 to 9 carbon atoms, such as an acetyl group, a pivaloyl group and a benzoyl group, etc.), an amino group (an alkylamino group having preferably 1 to 10 carbon atoms and more preferably 1 to 6 carbon atoms, an anilino group having preferably 6 to 12 carbon atoms and more preferably 6 to 8 carbon atoms, a heterocyclic amino group having preferably 1 to 12 carbon atoms and more preferably 2 to 6 carbon atoms, such as an amino group, a methylamino group and an anilino group, etc.), a thiol group, an alkylthio group (an alkylthio group having preferably 1 to 10 carbon atoms and more preferably 1 to 6 carbon atoms, such as a methylthio group and an ethylthio group, etc.), an arylthio group (an arylthio group having preferably 6 to 12 carbon atoms and more preferably 6 to 8 carbon atoms, such as a phenylthio group, etc.), a heterocyclic thio group (a heterocyclic thio group having preferably 2 to 10 carbon atoms and more preferably 1 to 6 carbon atoms, such as a 2-benzothiazolylthio group, etc.), an imido group (an imido group having preferably 2 to 10 carbon atoms and more preferably 4 to 8 carbon atoms, such as a N-succinimido group and a N-phthalimido group, etc).

Note that when the above monovalent substituent R has a hydrogen atom, the hydrogen atom may be further substituted with a substituent T (herein, substituent T is the same as defined in the above monovalent substituent R). Specific examples thereof include, but not particularly limited to an alkyl group substituted with a hydroxy group (for example, a hydroxyethyl group, etc.), an alkyl group substituted with an alkoxy group (for example, a methoxyethyl group, etc.), an alkyl group substituted with an aryl group (for example, a benzyl group, etc.), an alkyl group substituted with a primary or secondary amino group (for example, an aminoethyl group, etc.), an aryl group substituted with an alkyl group (for example, a p-tolyl group, etc.) and an aryloxy group substituted with an alkyl group (for example, a 2-methylphenoxy group, etc.).

Note that when the monovalent substituent R has a substituent T, the number of carbon atoms of the substituent T is not included in the number of carbon atoms mentioned above. For example, if R is a benzyl group, the number of carbon atoms of the benzyl group is counted by regarding the benzyl group as an alkyl group, which has a single carbon atom substituted with a phenyl group, and not regarding the benzyl group as an alkyl group, which has 7 carbon atoms substituted with a phenyl group. Furthermore, in the case where the above monovalent substituent R has a substituent T, a plurality of substituent T may be present.

A substituent represented by X is a divalent group comprising at least one group selected from the group consisting of an aromatic hydrocarbon group, a saturated or unsaturated alicyclic hydrocarbon group, a linear or branched and saturated or unsaturated aliphatic hydrocarbon group and a heterocyclic group. The aromatic hydrocarbon group, saturated or unsaturated alicyclic hydrocarbon group, linear or branched and saturated or unsaturated aliphatic hydrocarbon group and heterocyclic group may be substituted or unsubstituted.

X may contain a hetero atom, for example, X may contain an ether group, a sulfide group, a carbonyl group, a hydroxy group, an amino group, a sulfoxide group or a sulfone group.

Herein, examples of the aromatic hydrocarbon group include, but not particularly limited to, an o-phenylene group, a m-phenylene group, a p-phenylene group, a methylphenylene group, an o-xylylene group, a m-xylylene group, a p-xylylene group, a naphthylene group, an anthracenylene group, a phenanthrylene group, a biphenylene group and a fluonylene group.

Examples of the alicyclic hydrocarbon group include, but not particularly limited to, cycloalkenylene groups such as a cyclopentylene group, a cyclohexylene group, a methylcyclohexylene group, a cycloheptylene group and a cyclooctylene group; and cycloalkenylene groups such as a cyclohexycenylene group.

Examples of the aliphatic hydrocarbon group include, but not particularly limited to, linear or branched alkylene groups such as a methylene group, an ethylene group, a trimethylene group, a propylene group, an isopropylidene group, a tetramethylene group, an isobutylene group, a tert-butylene group, a pentamethylene group, a hexamethylene group, a heptamethylene group, an octamethylene group, a nonamethylene group and a dacamethylene group; and alkenylene groups such as a vinylene group, a propenylene group, a 1-butenylene group, a 2-butenylene group, a 1,3-butadienylene group, a 1-pentenylene group, a 2-pentenylene group, a 1-hexenylene group, a 2-hexenylene group and a 3-hexenylene group.

As X, the above substituent may further have a substituent. Specific examples thereof include a halogen, an alkoxy group, a hydroxy group, a carboxyl group, a carboalkoxy group, an amino group, an acyl group, a thio group (for example, an alkylthio group, a phenylthio group, a tolylthio group and a pyridylthio group), an amino group (for example, an unsubstituted amino group, a methylamino group, a dimethylamino group and a phenylamino group), a cyano group and a nitro group.

A polyester compound having a constitutional unit (a) represented by the above general formula (1) and a constitutional unit (b) represented by the above general formula (5) and/or general formula (6) can be obtained by polycondensation of, for example, a dicarboxylic acid having a tetralin ring or a derivative (I) thereof; a diol or a derivative (II) thereof; and tetrahydrophthalic anhydride, tetrahydrophthalic acid or a derivative (III) thereof.

The dicarboxylic acid having a tetralin ring or a derivative (I) thereof to be used in the present embodiment is represented by the following general formula (12). These may be used alone or in combination with two or more.

[Formula 9]

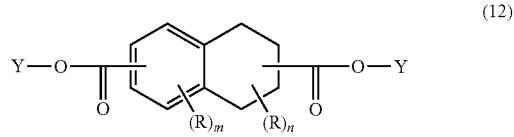

(12)

wherein R each independently represents a monovalent substituent, which is at least one selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a thiol group, an alkylthio group, an arylthio group, an heterocyclic thio group and an imido group, which may further have a substituent; wherein at least one hydrogen atom is bound to the benzyl position of the tetralin ring; wherein Y represents a hydrogen atom or an alkyl group, m represents an integer of 0 to 3, and n represents an integer of 0 to 6.

A compound represented by the above general formula (12) can be obtained by reacting, a dicarboxylic acid having a naphthalene ring represented by the following general formula (13) or a derivative thereof with hydrogen.

[Formula 10]

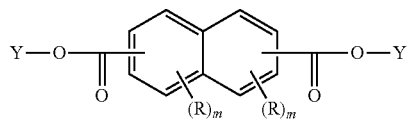

(13)

wherein R each independently represents a monovalent substituent which is at least one selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a thiol group, an alkylthio group, an arylthio group, an heterocyclic thio group and an imido group, which may further have a substituent; wherein Y represents a hydrogen atom or an alkyl group; and m each independently represents an integer of 0 to 3.

Examples of the diol or a derivative (II) thereof, to be used in the present embodiment, include ethylene glycol, diethylene glycol, triethylene glycol, polyethylene glycol, propylene glycol, dipropylene glycol, polypropylene glycol, 1,3-propanediol, 2-methyl-1,3-propanediol, 1,3-butanediol, 1,4-butanediol, 1,5-pentanediol, 1,6-hexanediol, 1,7-heptanediol, 1,8-octanediol, 1,9-nonandiol, neopentyl glycol, 1,4-cyclohexanedimethanol, 2-phenylpropanediol, 2-(4-hydroxyphenyl)ethyl alcohol, α,α-dihydroxy-1,3-diisopropylbenzene, α,α-dihydroxy-1,4-diisopropylbenzene, o-xylene glycol, m-xylene glycol, p-xylene glycol, hydroquinone, 4,4-dihydroxyphenyl and naphthalene diol or derivatives of these. These may be used alone or in combination with two or more.

Specific examples of the tetrahydrophthalic anhydride, tetrahydrophthalic acid or a derivative (III) thereof to be used in the present embodiment, include the compounds represented by the following general formulas (14) to (17). These may be used alone or in combination with two or more.

[Formula 11]

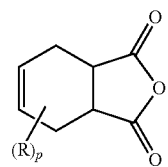

(14)

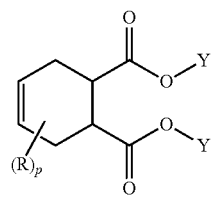

(15)

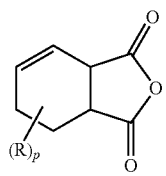

(16)

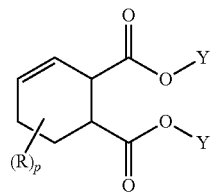

(17)

wherein R each independently represents a monovalent substituent, the monovalent substituent being at least one selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a thiol group, an alkylthio group, an arylthio group, a heterocyclic thio group and an imido group, optionally further having a substituent; wherein Y represents a hydrogen atom or an alkyl group; and p represents an integer of 1 to 5.

Examples of R in each of the above formulas may be the same as specified in the formulas (1) to (6). Furthermore, Y in each of the above formulas may be a hydrogen atom or an alkyl group in view of polymerization, etc. Examples thereof include a hydrogen atom, a methyl group, an ethyl group, an n-propyl group, an isopropyl group, a tert-butyl group, a n-octyl group and 2-ethylhexyl group.

Examples of the tetrahydrophthalic anhydride, tetrahydrophthalic acid, and derivatives thereof represented by the general formulas (14) to (17) may include many compounds. Among them, in view of oxygen-absorbing performance and reaction rate, methyl tetrahydrophthalate and methyl tetrahydrophthalic anhydride are preferred. Among them, 3-methyl tetrahydrophthalate, 3-methyl tetrahydrophthalic anhydride, 4-methyl tetrahydrophthalate and 4-methyl tetrahydrophthalic anhydride are more preferred, and 3-methyl-1,2,3,6-tetrahydrophthalic anhydride, 4-methyl-1,2,5,6-tetrahydrophthalic anhydride and 4-methyl-1,2,3,6-tetrahydrophthalic anhydride are further preferred. These may be used alone or in combination with two or more.

Furthermore, a polyester compound having a constitutional unit (a) represented by the above general formula (2) and a constitutional unit (b) represented by the above general formula (5) and/or general formula (6) can be obtained by polycondensation of, for example, a diol having a tetralin ring or a derivative (IV) thereof; a dicarboxylic acid or a derivative (V) thereof; and a tetrahydrophthalic anhydride, tetrahydrophthalic acid or a derivative (III) thereof. The tetrahydrophthalic anhydride, tetrahydrophthalic acid or a derivative (III) thereof is as defined above.

Examples of the diol having a tetralin ring or a derivative (IV) thereof to be used in the present embodiment include compounds represented by the following general formula (18). These may be used alone or in combination with two or more.

[Formula 12]

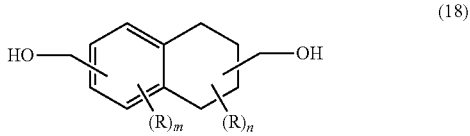

(18)

wherein R each independently represents a monovalent substituent, which is at least one selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a thiol group, an alkylthio group, an arylthio group, a heterocyclic thio group and an imido group, which may further have a substituent; wherein at least one hydrogen atom is bound to the benzyl position of the tetralin ring; wherein m represents an integer of 0 to 3; and n represents an integer of 0 to 6.

Note that a compound represented by the above general formula (18) can be obtained by reacting, for example, a diol having a naphthalene ring represented by the following general formula (19) or a derivative thereof with hydrogen.

[Formula 13]

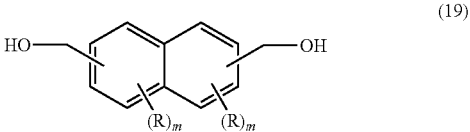

(19)

wherein R each independently represents a monovalent substituent, which is at least one selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a thiol group, an alkylthio group, an arylthio group, a heterocyclic thio group and an imido group, which may further have a substituent; wherein m each independently represents an integer of 0 to 3.

Examples of R in each of the above formulas may be the same as specified in the formulas (1) to (6).

Examples of the dicarboxylic acid or a derivative (V) thereof, to be used in the present embodiment, include benzene dicarboxylic acid such as oxalic acid, malonic acid, succinic acid, glutaric acid, adipic acid, pimelic acid, suberic acid, azelaic acid, sebacic acid, undecane diacid, dodecane diacid, 3,3-dimethylpentane diacid, phthalic acid, isophthalic acid and terephthalic acid, and naphthalene dicarboxylic acid such as 2,6-naphthalene dicarboxylic acid, anthracene dicarboxylic acid, phenyl malonic acid, phenylene diacetic acid, phenylene dibutyric acid, 4,4-diphenyletherdicarboxylic acid and p-phenylene dicarboxylic acid or derivatives of these. These may be used alone or in combination with two or more.

A polyester compound having a constitutional unit (a) represented by the above general formula (3) or general formula (4) and a constitutional unit (b) represented by the above general formula (5) and/or general formula (6), can be obtained by, for example, polycondensation of a hydroxycarboxylic acid having a tetralin ring or a derivative (VI) thereof; a diol or a derivative (II) thereof; and a tetrahydrophthalic anhydride, tetrahydrophthalic acid or a derivative (III) of thereof.

Examples of the hydroxycarboxylic acid having a tetralin ring or a derivative (VI) thereof to be used in the present embodiment include compounds represented by the following general formula (20) or general formula (21). These may be used alone or in combination with two or more.

[Formula 14]

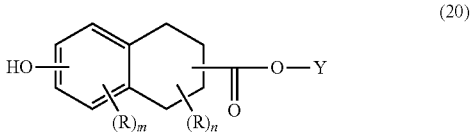

(20)

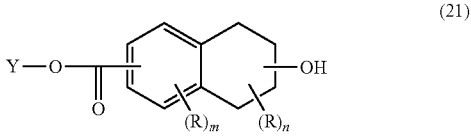

(21)

wherein R each independently represents a monovalent substituent, which is at least one selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a thiol group, an alkylthio group, an arylthio group, a heterocyclic thio group and an imido group, which may further have a substituent; wherein at least one hydrogen atom is bound to the benzyl position of the tetralin ring; wherein Y represents a hydrogen atom or an alkyl group; m represents an integer of 0 to 3 and n represents an integer of 0 to 6.

Examples of R in each of the above formulas may be the same as specified in the formulas (1) to (6). Furthermore, Y in each of the above formulas may be a hydrogen atom or an alkyl group in view of polymerization. Examples thereof include a hydrogen atom, a methyl group, an ethyl group, a n-propyl group, an isopropyl group, a tert-butyl group, a n-octyl group and a 2-ethylhexyl group.

A polyester compound having a constitutional unit represented by the above general formula (1) or (2) can be also obtained, for example, by a hydrogenation reaction of a polyester compound having a constitutional unit represented by the following general formula (22) or (23).

[Formula 15]

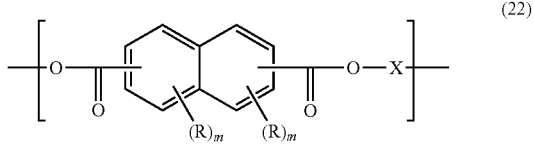

(22)

wherein R each independently represents a monovalent substituent, which is at least one selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a thiol group, an alkylthio group, an arylthio group, a heterocyclic thio group and an imido group, which may further have a substituent; wherein X represents a divalent group comprising at least one group selected from the group consisting of an aromatic hydrocarbon group, a saturated or unsaturated alicyclic hydrocarbon group, a linear or branched and saturated or unsaturated aliphatic hydrocarbon group and a heterocyclic group; wherein m each independently represents an integer of 0 to 3.

[Formula 16]

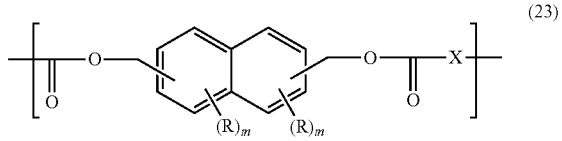

(23)

wherein R each independently represents a monovalent substituent, which is at least one selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a thiol group, an alkylthio group, an arylthio group, a heterocyclic thio group and an imido group, which may further have a substituent; X represents a divalent group comprising at least one group selected from the group consisting of an aromatic hydrocarbon group, a saturated or unsaturated alicyclic hydrocarbon group, a linear or branched and saturated or unsaturated aliphatic hydrocarbon group and a heterocyclic group; m each independently represents an integer of 0 to 3.

Examples of R in each of the above formulas may be the same as specified in the formulas (1) to (6). Examples of Y in each of the above formulas may be a hydrogen atom or an alkyl group in view of polymerization. Examples thereof include a hydrogen atom, a methyl group, an ethyl group, a n-propyl group, an isopropyl group, a tert-butyl group, a n-octyl group and a 2-ethylhexyl group.

Into the polyester compound of the present embodiment, a constitutional unit having no tetralin ring may be integrated as a copolymerization component as long as performance is not affected. More specifically, e.g., a compound exemplified as the diol or a derivative (II) thereof and a compound exemplified as the dicarboxylic acid or a derivative (V) thereof can be used as a copolymerization component.

Preferable specific examples of the constitutional unit (a) include the units represented by the formulas (7) to (9), etc.; but not particularly limited to these.

The aforementioned polyester compounds all have hydrogen at the benzyl position of a tetralin ring, and have hydrogen at the allyl position of the tetrahydrophthalic anhydride, the allyl position of the tetrahydrophthalic acid or the allyl positions of derivatives thereof. Then, more excellent oxygen absorptivity is exhibited by removing not only hydrogen at the benzyl position but also the hydrogen at the allyl position (However, function effects of the present embodiment are not limited to these).

Furthermore, the oxygen-absorbing resin composition of the present embodiment can also suppress odor generation after absorption of oxygen. The reason is not elucidated; however, it is presumed that, for example, the following oxidation reaction mechanism may contribute. In a polyester compound, first, hydrogen at the allyl position of a tetrahydrophthalic anhydride, tetrahydrophthalic acid or a derivative thereof is removed to produce a radical. The radical removes hydrogen at the benzyl position of the tetralin ring to further produce a radical. Thereafter, the radicals react with oxygen to oxidize carbon at the benzyl position. In this manner, a hydroxy group or a ketone group is conceivably produced. Accordingly, in the oxygen-absorbing resin composition of the present embodiment, cleavage of the molecular chain of an oxygen-absorbing base compound by the oxidation reaction as is in related art is suppressed and thus the structure of the polyester compound is maintained. For the reason, even after the oxygen-absorbing resin composition of the present embodiment absorbs oxygen, generation of a low molecular-weight organic compound, which is a cause of odor, can be suppressed, with the result that an increase of odor intensity after absorption of oxygen is presumably suppressed (However, function effects of the present embodiment are not limited to these).

In the case where the polyester compound of the present embodiment comprises a constitutional unit (a) represented by the general formula (1), the molar ratio of the constitutional unit (a) represented by the general formula (1) and a constitutional unit (b), in view of balance between oxygen-absorbing performance, and physical properties and moldability of a resin composition, is preferably 99:1 to 50:50 (constitutional unit (a):constitutional unit (b)), more preferably 97:3 to 60:40 and further preferably 95:5 to 70:30.

The limiting viscosity of the polyester compound of the present embodiment (measurement value at 25° C. using a solvent mixture containing phenol and 1,1,2,2-tetrachloro ethane in a mass ratio of 6:4 (phenol:1,1,2,2-tetrachloro ethane)) is not particularly limited; however, in view of moldability of a polyester compound, the limiting viscosity is preferably 0.1 to 2.0 dL/g and more preferably 0.5 to 1.5 dL/g. The limiting viscosity can be measured by a method according to JIS K 7367.

Furthermore, to the oxygen-absorbing resin composition of the present embodiment, if necessary, e.g., a transition metal catalyst, a radical generator and a photo initiator may be further added in order to facilitate an oxygen absorption reaction.

The transition metal catalyst is not particularly limited and any catalyst selected from those known in the art can be appropriately selected to be used as long as it can serve as a catalyst for the oxidation reaction of the above polyester compound. Specific examples of the transition metal catalyst include an organic acid salt of a transition metal, a halide, a phosphate, a phosphite, a hypophosphite, a nitrate, a sulfate, an oxide and a hydroxide.

Examples of the transition metal to be contained in the transition metal catalyst herein include, but not limited to, titanium, vanadium, chrome, manganese, iron, cobalt, nickel, copper, zinc, ruthenium and rhodium. Among them, in view of oxygen-absorbing rate, manganese, iron, cobalt, nickel and copper are preferred.

Furthermore, example of the organic acid include, but not limited to, acetic acid, propionic acid, octanoic acid, lauric acid, stearic acid, acetylacetone, dimethyldithiocarbamic acid, palmitic acid, 2-ethylhexanoic acid, neo-decanoic acid, linoleic acid, tall oil acid, oleic acid, capric acid and naphthenic acid.

The transition metal catalyst is preferably a combination of any one of these transition metals and an organic acid, and more preferably, a combination of a transition metal, such as manganese, iron, cobalt, nickel or copper, and an organic acid, such as acetic acid, stearic acid, 2-ethylhexanoic acid, oleic acid or naphthenic acid. Note that transition metal catalysts can be used alone or in combination with two or more.

Examples of the radical generator include various types of N-hydroxy imide compounds. Specific examples thereof include N-hydroxysuccinimide, N-hydroxymaleimide, N,N'-dihydroxycyclohexanetetracarboxydiimide, N-hydroxyphthalimide, N-hydroxytetrachlorophthalimide, N-hydroxytetrabromophthalimide, N-hydroxyhexahydrophthalimide, 3-sulfonyl-N-hydroxyphthalimide, 3-methoxycarbonyl-N-hydroxyphthalimide, 3-methyl-N-hydroxyphthalimide, 3-hydroxy-N-hydroxyphthalimide, 4-nitro-N-hydroxyphthalimide, 4-chloro-N-hydroxyphthalimide, 4-methoxy-N-hydroxyphthalimide, 4-dimethylamino-N-hydroxyphthalimide, 4-carboxy-N-hydroxyhexahydrophthalimide, 4-methyl-N-hydroxyhexahydrophthalimide, N-hydroxyhetimide, N-hydroxyhimimide, N-hydroxytrimellitimide and N,N-dihydroxypyromellitdiimide Examples of the photo initiator include benzophenone and a derivative thereof, a thiazine dye, a metal porphyrin derivative and an anthraquinone derivative.

A polyester compound and an additive for facilitating an oxygen absorption reaction can be mixed in accordance with a known method; however, a kneading method by an extruder is preferred. In this manner, an oxygen-absorbing resin composition further excellent in dispersibility can be obtained. Furthermore, to the oxygen-absorbing resin composition, additives such as a drying agent, a pigment, a dye, an antioxidant, a slipping agent, an antistatic agent, a stabilizer; fillers such as calcium carbonate, clay, mica and silica; and a deodorant may further be added, as long as the effect of the present embodiment is not damaged. The additives are not limited to the aforementioned ones and additives may be added.

The oxygen-absorbing resin composition of the present embodiment may be kneaded together with other thermoplastic resins by an extruder. Examples of the thermoplastic resin for use in kneading include a low-density polyethylene, a medium-density polyethylene, a high-density polyethylene, a linear low-density polyethylene, a linear and extremely low-density polyethylene, polypropylene, poly-1-butene, poly-4-methyl-1-pentene or a polyolefin such as a random or block copolymer of α-olefins such as ethylene, propylene, 1-butene, and 4-methyl-1-pentene; acid modified polyolefins such as maleic anhydride grafted polyethylene and maleic anhydride grafted polypropylene; ethylene-vinyl compound copolymers such as an ethylene-vinyl acetate copolymer, an ethylene-vinyl alcohol copolymer, an ethylene-vinyl chloride copolymer, an ethylene-(meth)acrylate copolymer and an ion crosslinked product (ionomer), an ethylene-methyl methacrylate copolymer; styrene resins such as polystyrene, an acrylonitrile-styrene copolymer and an α-methylstyrene-styrene copolymer; polyvinyl compounds such as poly(methyl acrylate) and poly(methyl methacrylate); polyamides such as nylon 6, nylon 66, nylon 610, nylon 12 and poly(metaxylylene adipamide) (MXD6); polyesters such as poly(ethylene terephthalate) (PET), poly(butylene terephthalate) (PBT), poly(trimethylene terephthalate) (PTT), poly(ethylene naphthalate) (PEN), glycol-modified poly(ethylene terephthalate) (PETG), poly(ethylene succinate) (PES), poly(butylene succinate) (PBS), polylactate, polyglycolate, polycaprolactone and polyhydroxyalkanoate; polycarbonates; and polyether such as a polyethylene oxide, or mixtures of these.

Use form of the oxygen-absorbing resin composition of the present embodiment is not particularly limited. The oxygen-absorbing resin composition is processed, for example, into powdery, granular, pellet, film-forms or other small-piece forms. The processed article is packed in an air-permeable packaging material and can be used as a small-bag oxygen absorbent packaging body. Alternatively, the oxygen-absorbing resin composition is molded into film-form and used as an oxygen-absorbing material in the form of e.g., a label, a card and a packing.

The oxygen-absorbing resin composition of the present embodiment can be used not only as a single-layer packaging material and packaging container but also as an oxygen-absorbing multilayer packaging material and an oxygen-absorbing multilayer packaging container having a multilayer structure constituted of at least one layer formed of the oxygen-absorbing resin composition and at least one layer formed of other resin(s). Generally, the oxygen-absorbing resin composition of the present embodiment is preferably provided to an interior side rather than the outer surface of a container, etc. so as not to be exposed on the outer surface of the container etc. To avoid direct contact with the content of a container, the oxygen-absorbing resin composition is preferably provided on an outer side than the inner surface of the container, etc. Likewise, at least one intermediate layer constituting a multilayer structure of an oxygen-absorbing multilayer packaging material and an oxygen-absorbing multilayer packaging container is preferably a layer comprising the oxygen-absorbing resin composition of the present embodiment.

The oxygen-absorbing resin composition of the present embodiment can be used as a film-form or sheet-form oxygen-absorbing multilayer body having at least three layers, i.e., a sealant layer comprising a polyolefin resin, an oxygen-absorbing layer comprising an oxygen-absorbing resin composition and a gas barrier layer comprising a gas barrier substance. Furthermore, the obtained oxygen-absorbing multilayer body can be used as an oxygen-absorbing paper container by laminating a paper substrate on the outer layer of the gas barrier layer. Note that, unless otherwise specified, the oxygen-absorbing multilayer body having a thickness of 0.1 to 500 μm is specified as a "film"; whereas the oxygen-absorbing multilayer body having a thickness of more than 500 μm is specified as a "sheet".

As the gas barrier substance to be used as the gas barrier layer of the present embodiment, a thermoplastic resin having a gas barrier property, a thermosetting resin having a gas barrier property, vapor deposition films such as silica, alumina and aluminum and a metal foil such as an aluminum foil can be used. Examples of the thermoplastic resin having a gas barrier property include an ethylene-vinyl alcohol copolymer, MXD6 and poly(vinylidene chloride). Examples of the thermosetting resin having a gas barrier property include an epoxy resin having a gas barrier property, (for example, "MAXIVE" manufactured by Mitsubishi Gas Chemical Company, Inc).

As a method for manufacturing an oxygen-absorbing multilayer body, known methods such as a coextrusion method, a laminating method and a coating method can be applied depending upon e.g., the properties of the material, purpose of processing and processing step. For molding e.g., a film or a sheet is formed by a manufacturing method of extruding a molten resin composition through e.g., a T die and a circular die by an extruder attached therewith or by a method of applying an adhesive to an oxygen-absorbing film or a sheet and adhering it to another film or sheet. Also, if molten resins are simultaneously injected or sequentially injected through multilayered multiple dies into an injection mold by use of an injector, a multilayer container or a preform for manufacturing a container having a predetermined shape can be formed. The preform is heated to a drawing temperature and stretched in the axial direction and simultaneously stretched in the circumferential direction in accordance with blow-stretching by hydrostatic pressure to obtain a stretch blown bottle.

The obtained oxygen-absorbing multilayer body is produced, for example, in the form of film and processed into e.g., a bag-form or a cover material and can be put in use. Alternatively, the oxygen-absorbing multilayer body of the present embodiment is produced, for example, in the form of sheet and thermoformed into an oxygen-absorbing container of a predetermined shape such as a tray, a cup, a bottle and a tube by a molding method such as vacuum molding, air-pressure forming and plug assist molding. The obtained bag-form container and cup-form container can be subjected to a boil sterilization treatment of 80 to 100° C., a semi-retort sterilization treatment of 100 to 135° C., a retort sterilization treatment and a high retort sterilization treatment. The obtained oxygen-absorbing multilayer body, if it is filled with stuff such as food and an open hole is provided for releasing water vapor during microwave cooking, can be preferably used as a pouch for microwave cooking provided with a hole for easily releasing water vapor.

As specifically described in the foregoing, the oxygen-absorbing resin composition and various types of articles using the composition, since they have excellent oxygen-absorbing performance in a wide range of humidity conditions from low humidity to high humidity and can absorb oxygen regardless of the presence or absence of the water content of an object to be stored, can be used in a wide variety of uses regardless of the type of an object to be stored. In particular, since generation of odor after absorption of oxygen is suppressed, the composition and articles can be particularly preferably used, for example, for foods, prepared food, beverages, health foods and medicinal products.

Other examples of the objects to be stored include, but not limited to, dry foods such as powdered seasoning, powdered coffee, coffee beans, rice, tea, beans, Japanese cracker and rice cracker; medicinal products; health foods such as vitamin supplements, processed rice foods such as polished rice, steamed rice, festive red rice and rice cake; prepared foods such as soup, stew and curry; confectioneries such as fruit, adzuki-bean jelly, pudding, cake and steamed bean-jam buns; seafood products such as tuna and fish and shellfish; processed milk products or processed egg products such as cheese, butter and egg, processed livestock products such as meat, salami sausage, sausage and ham; vegetables such as carrot, potato, asparagus and shiitake mushroom; and beverages such as beer, wine, fruit juice and carbonated soft drink.

EXAMPLES

The present invention will be more specifically described by use of Examples and Comparative Examples, below; however, the present invention is not limited by these. Unless otherwise specified, NMR measurement was performed at room temperature.

Synthesis Example of Monomer

To an autoclave of 18 L (inner volume), dimethyl naphthalene-2,6-dicarboxylate (2.20 kg), 2-propanol (1.10 kg) and a catalyst (350 g containing 50 mass % of water) of 5 mass % palladium immobilized on active carbon were charged. Subsequently, the air within the autoclave was replaced with nitrogen and the nitrogen was further replaced with hydrogen. Thereafter, hydrogen was supplied until the interior pressure of the autoclave reached 0.8 MPa. Next, a stirrer was driven and a rotation speed was adjusted to be 500 rpm. After the interior temperature was increased up to 100° C. over 30 minutes, hydrogen was supplied to raise the internal pressure up to 1 MPa. This state was maintained for 7 hours. Since absorption of hydrogen was stopped, the autoclave was cooled and hydrogen was released, and then the reaction solution was taken out from the autoclave. After the reaction solution was filtered and the catalyst was removed, 2-isopropanol was distilled away from the separated filtrate by an evaporator. To the crude product obtained, 2-propanol (4.40 kg) was added. Dimethyl tetralin-2,6-dicarboxylate was purified by recrystallization in a yield of 80%. Note that NMR analysis results were as follows. $^{1}$H-NMR (400 MHz CDCl$_{3}$) δ7.76-7.96 (2H m), 7.15 (1H d), 3.89 (3H s), 3.70 (3H s), 2.70-3.09 (5H m), 1.80-1.95 (1H m).

Production Example of Polymer

Production Example 1

To a manufacturing apparatus equipped with a packed tower system rectifier, a partial condenser, a total condenser, a cold trap, a stirrer, a heating unit and a nitrogen inlet tube, dimethyl tetralin-2,6-dicarboxylate (524 g), 1,4-butanediol (320 g), 18.5 g of a tetrahydrophthalic anhydride isomer mixture (trade name "HN-2200", manufactured by Hitachi Chemical Co., Ltd.) containing 3-methyl-1,2,3,6-tetrahydrophthalic anhydride (formula (10)) and 4-methyl-1,2,5,6-tetrahydrophthalic anhydride (formula (11)) in a total amount of 65 mol %, and tetrabutyl titanate (0.174 g) were charged. The temperature of the mixture was raised to 210° C. under a nitrogen atmosphere to perform a transesterification reaction. After the reaction conversion rate of the dicarboxylic acid component reached 85%; or more, tetrabutyl titanate (0.174 g) was added. The temperature of mixture was gradually raised and the pressure of the mixture was gradually reduced. While the temperature was maintained at 245° C., a polycondensation reaction was performed at a pressure of 133 Pa or less to obtain polyester compound A. Polyester compound A had a constitutional unit represented by the formula (8) as the constitutional unit (a) and had at least a constitutional unit represented by the formula (10) and a constitutional unit represented by the formula (11) as the constitutional unit (b). In polyester compound A, the molar ratio of the constitutional unit (a):constitutional unit (b) was 94.5:5.5. In the constitutional unit (b), the total amount of constitutional unit represented by the formula (10) and constitutional unit represented by the formula (11) was 65 mol %.

The weight average molecular weight and number average molecular weight of polyester compound A obtained were measured by GPC (gel permeation chromatography). As a result, the polystyrene-equivalent weight average molecular weight was 8.4×10$^{4}$ whereas the number average molecular weight thereof was 2.8×10$^{4}$. The glass transition temperature and the melting point were measured by DSC. As a result, the glass transition temperature was 35° C. and the melting point was not detected because of an amorphous structure. The measurement conditions were as follows.

GPC: measured according to JIS K 7252. Chloroform was used as a solvent, a molecular weight was obtained in terms of polystyrene-equivalent.

Grass transition temperature: measured according to JIS K 7121

Melting point: measured according to JIS K 7121

Production Example 2

Polyester compound B was obtained in the same manner as in Production Example 1 except that ethylene glycol (246 g by mass) was used in place of 1,4-butanediol used in Production Example 1, and dimethyl tetralin-2,6-dicarboxylate (584 g), 20.6 g of the aforementioned tetrahydrophthalic anhydride isomer mixture (trade name "HN-2200", manufactured by Hitachi Chemical Co., Ltd.) and tetrabutyl titanate (0.194 g) were used. Polyester compound B had a constitutional unit represented by the formula (7) as the constitutional unit (a) and at least a constitutional unit represented by the formula (10) and a constitutional unit represented by the formula (11) as the constitutional unit (b). In polyester compound B, the molar ratio of the constitutional unit (a):constitutional unit (b) was 95:5. In the constitutional unit (b), the total amount of constitutional unit represented by the formula (10) and constitutional unit represented by the formula (11) was 65 mol %. The polystyrene-equivalent weight average molecular weight of polyester compound B was $8.1\times10^4$; whereas the number average molecular weight thereof was $2.4\times10^4$. The glass transition temperature was 66° C. and the melting point was not detected because of an amorphous structure.

Production Example 3

Polyester compound C was obtained in the same manner as in Production Example 2 except that dimethyl tetralin-2,6-dicarboxylate (495 g), ethylene glycol (264 g) and 110 g of the aforementioned tetrahydrophthalic anhydride isomer mixture (trade name "HN-2200", manufactured by Hitachi Chemical Co., Ltd.) and tetrabutyl titanate (0.154 g) were used. Polyester compound C had a constitutional unit represented by the formula (7) as the constitutional unit (a) and at least a constitutional unit represented by the formula (10) and a constitutional unit represented by the formula (11) as the constitutional unit (b). In polyester compound C, the molar ratio of the constitutional unit (a):constitutional unit (b) was 74:26. In the constitutional unit (b), the total amount of constitutional unit represented by the formula (10) and constitutional unit represented by the formula (11) was 65 mol %. The polystyrene-equivalent weight average molecular weight of polyester compound C was $1.1\times10^5$; whereas the number average molecular weight thereof was $1.6\times10^4$. The glass transition temperature was 60° C. and the melting point was not detected because of an amorphous structure.

Production Example 4

Polyester compound D was obtained in the same manner as in Production Example 1 except that 1,6-hexanediol (380 g by mass) was used in place of 1,4-butanediol, and dimethyl tetralin-2,6-dicarboxylate (474 g), 16.71 g of the aforementioned tetrahydrophthalic anhydride isomer mixture (trade name "HN-2200", manufactured by Hitachi Chemical Co., Ltd.) and tetrabutyl titanate (0.157 g) were used. Polyester compound D had a constitutional unit represented by the formula (9) as constitutional unit (a), and at least a constitutional unit represented by the formula (10) and a constitutional unit represented by the formula (11) as the constitutional unit (b). In polyester compound D, the molar ratio of the constitutional unit (a):constitutional unit (b) was 95:5. In the constitutional unit (b), the total amount of constitutional unit represented by the formula (10) and constitutional unit represented by the formula (11) was 65 mol %. The polystyrene-equivalent weight average molecular weight of polyester compound D was $7.8\times10^4$; whereas, the number average molecular weight thereof was $2.3\times10^4$. The glass transition temperature was 17° C. and the melting point was 132° C.

Production Example 5

Polyester compound E was obtained in the same manner as in Production Example 1 except that the tetrahydrophthalic anhydride isomer mixture (trade name "HN-2200", manufactured by Hitachi Chemical Co., Ltd.) used in Production Example 1 was not used, and dimethyl tetralin-2,6-dicarboxylic acid (543 g) and 1,4-butanediol (315 g) and tetrabutyl titanate (0.171 g) were used. Polyester compound E had a constitutional unit represented by the formula (8) as the constitutional unit (a) and no constitutional unit (b). The polystyrene-equivalent weight average molecular weight of polyester compound E was $8.5\times10^4$; whereas the number average molecular weight thereof was $3.3\times10^4$. The glass transition temperature was 36° C. and the melting point was 145° C.

Example 1

Polyester compound A (100 parts by mass) was formed into a film having a width of 130 mm and a thickness of 95 to 105 μm by a double-screw extruder having two screws of 20 mm in diameter under the conditions: an extrusion temperature of 220° C., a screw rotation number of 60 rpm, a feed screw rotation number of 16 rpm and a haul-off speed of 1.3 m/mi, and cut into films having a size of 100 mm×100 mm per film to obtain an oxygen-absorbing film.

Next, two gas barrier bags (trade name, "ALH-2430" manufactured by Meiwa Pax Co., Ltd.) formed of an aluminum foil laminate film were prepared. In each of the gas barrier bags, a single oxygen-absorbing film (100 m×100 mm) was placed and air (500 cc) was supplied. In the meantime, the relative humidity of one of the gas barrier bags was adjusted to be 100%; whereas the relative humidity of the other gas barrier bag was adjusted to be 30%. Thereafter, they were separately sealed to prepare two sealed bags (relative humidity 100%, 30%). The two sealed bags were stored at 40° C. for 14 days. The total amounts of oxygen absorbed during the storage were separately measured.

As to the sealed bag whose relative humidity was adjusted to be 100%, the shape of the film was checked after the bag was stored at 40° C. and a relative humidity of 100% for one month. Whether the film maintained or lost shape was determined based on the following criteria. The results were shown in Table 1.

Maintained: neither cracks nor flaws developed in a film before storage.

Lost: cracks and flaws developed in a film before storage.

Example 2

A film was made in the same manner as in Example 1 except that polyester compound A was replaced with polyester compound B. The amount of oxygen absorbed was measured and the shape was checked. The results were shown in Table 1.

Example 3

A film was made in the same manner as in Example 1 except that polyester compound A was replaced with polyester compound C. The amount of oxygen absorbed was measured and the shape was checked. The results were shown in Table 1.

Example 4

A film was made in the same manner as in Example 1 except that polyester compound A was replaced with polyester compound D. The amount of oxygen absorbed was measured and the shape was checked. The results were shown in Table 1.

Comparative Example 1

A film was made in the same manner as in Example 1 except that polyester compound A of Example 1 was replaced with N-MXD6 (a polyamide resin formed of metaxylene diamine and adipic acid; trade name "MX nylon S6011" manufactured by Mitsubishi Gas Chemical Company Inc.), and cobalt stearate (II) was dry-blended by a tumbler mixer so as to provide a cobalt amount of 0.025 parts by mass based on 100 parts by mass of N-MXD6. The amount of oxygen absorbed was measured and the shape was checked. The results were shown in Table 1.

Comparative Example 2

A film was made in the same manner as in Example 1 except that polyester compound A was replaced with polyester compound E. The amount of oxygen absorbed was measured and the shape was checked. The results were shown in Table 1.

TABLE 1

|  | Resin | Amount of oxygen absorbed[1] | | Shape of film[2] |
|---|---|---|---|---|
|  |  | Humidity 100% | Humidity 30% |  |
| Example 1 | Polyester compound A | 20 cc | 18 cc | Maintained |
| Example 2 | Polyester compound B | 14 cc | 16 cc | Maintained |
| Example 3 | Polyester compound C | 18 cc | 18 cc | Maintained |
| Example 4 | Polyester compound D | 22 cc | 20 cc | Maintained |
| Comparative Example 1 | N-MXD6 | 10 cc | 2 cc | Lost |
| Comparative Example 2 | Polyester compound E | 2 cc | 1 cc | Maintained |

[1] Total amount of oxygen absorbed for 14 days after initiation of test
[2] Evaluation after storage at 40° C. and a humidity of 100% for one month As is apparent from the table, it was confirmed that the oxygen-absorbing resin composition of each Example shows a satisfactory oxygen-absorbing performance under both high humidity and low humidity conditions, and the shape of the film is maintained even after absorption of oxygen.

The present application is based on Japanese Patent Application No. 2012-224915 filed with the Japan Patent Office on Oct. 10, 2012, the content of which is incorporated herein by reference.

INDUSTRIAL APPLICABILITY

The oxygen-absorbing resin composition of the present invention, since it at least exhibits excellent oxygen-absorbing performance in a wide range of humidity conditions from low humidity to high humidity, can be widely and efficiently used generally in technical fields requiring absorption of oxygen, for example, as a raw material for packages and containers for storing a product such as foods, prepared foods, beverages, health foods and medicinal products.

The invention claimed is:
1. An oxygen-absorbing resin composition comprising a polyester compound having a constitutional unit (a), which has at least one tetralin ring, selected from the group consisting of the following general formulas (1) to (4):

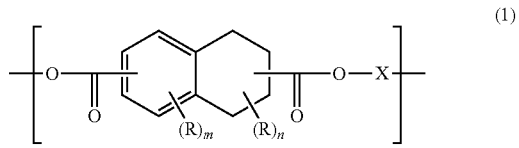

(1)

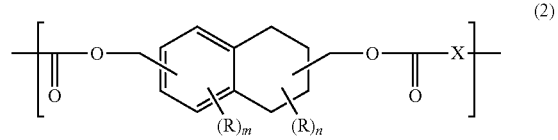

(2)

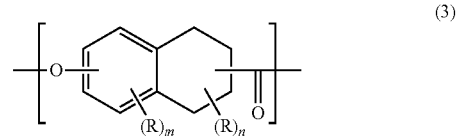

(3)

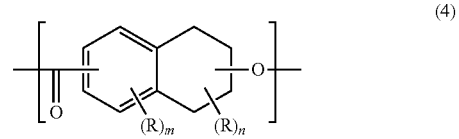

(4)

wherein each R independently represents a monovalent substituent, the monovalent substituent being at least one selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a thiol group, an alkylthio group, an arylthio group, a heterocyclic thio group and an imido group, optionally further having a substituent; wherein at least one hydrogen atom is bound to a benzyl position of the tetralin ring; wherein X represents a divalent group comprising at least one group selected from the group consisting of an aromatic hydrocarbon group, a saturated or unsaturated alicyclic hydrocarbon group and a linear or branched and saturated or unsaturated aliphatic hydrocarbon group and a heterocyclic group; wherein each m independently represents an integer of 0 to 3 and each n independently represents an integer of 0 to 6 and a constitutional unit (b), comprising residue of tetrahydrophthalic anhydride derivative which is represented by the following general formula (5) and/or general formula (6),

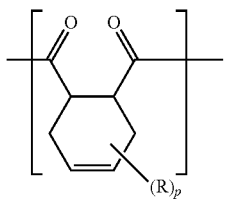
(5)

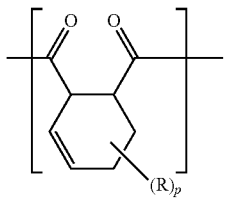
(6)

wherein each R independently represents a monovalent substituent, the monovalent substituent being at least one selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a thiol group, an alkylthio group, an arylthio group, a heterocyclic thio group and an imido group, optionally further having a substituent; wherein each p independently represents an integer of 1 to 5.

2. The oxygen-absorbing resin composition according to claim 1, wherein the polyester compound contains the constitutional unit (a) represented by the general formula (1) and the constitutional unit (b) in a molar ratio of 99:1 to 50:50.

3. The oxygen-absorbing resin composition according to claim 1, wherein the constitutional unit (a) is at least one selected from the group consisting of the following formula (7), formula (8) and formula (9)

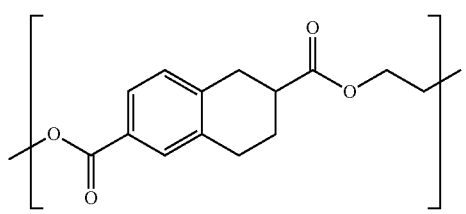
(7)

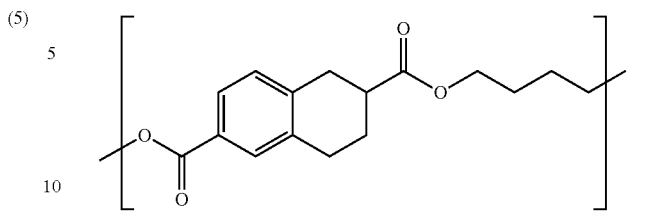
(8)

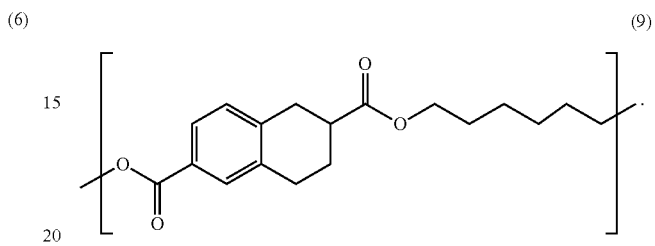
(9)

4. The oxygen-absorbing resin composition according to claim 1, wherein the constitutional unit (b) is at least the following formula (10) and/or formula (11),

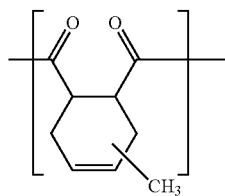
(10)

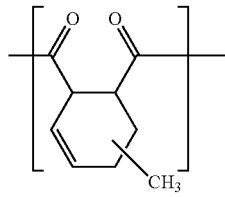
(11)

a total amount of formula (10) and formula (11) in the constitutional unit (b) is 50 mol % or more.

* * * * *